United States Patent [19]

Gordon et al.

[11] Patent Number: 4,804,897
[45] Date of Patent: Feb. 14, 1989

[54] ORIENTATION-DEPENDANT ROBOT CONTROLLER

[75] Inventors: Gary B. Gordon, Saratoga; Miles Spellman, Redwood City, both of Calif.

[73] Assignee: Hewlett-Packard Company, Palo Alto, Calif.

[21] Appl. No.: 87,067

[22] Filed: Aug. 19, 1987

[51] Int. Cl.⁴ .............................................. G05B 19/42
[52] U.S. Cl. ........................................ 318/568; 901/3; 901/4; 364/513
[58] Field of Search ................... 318/568; 200/6 A; 901/3, 4; 364/513

[56] References Cited

U.S. PATENT DOCUMENTS

| 3,018,750 | 1/1962 | Hill | 200/6 A X |
| 4,263,538 | 4/1981 | Richiardi | 901/4 X |
| 4,425,488 | 1/1984 | Moskin et al. | 200/6 A X |
| 4,445,011 | 4/1984 | Hansen | 200/6 A X |
| 4,450,325 | 5/1984 | Luque | 200/6 A X |

FOREIGN PATENT DOCUMENTS 2582245  11/1986  France ..................... 901/4

*Primary Examiner*—Benjamin Dobeck
*Attorney, Agent, or Firm*—John A. Frazzini

[57] ABSTRACT

A joystick controller includes three gravity sensing switches, the outputs of which can be used in the assignment of joystick transducer outputs in six different ways depending on controller orientation. This permits intuitive control of a robot arm in that translational motions can always be effected by moving the joystick in the direction the arm is to move. Thus, a controller which is economical, reliable and intuitive multiplies the functions available from what is basically a two or three dimensional controller.

10 Claims, 1 Drawing Sheet

ORIENTATION-DEPENDANT ROBOT CONTROLLER

BACKGROUND OF THE INVENTION

The present invention relates to controllers and more particularly, to teaching pendants for robots. A major objective of the present invention is to provide a maximally intuitive controller.

Teaching pendants have been developed so that robots can be programmed without character-based programming languages. Related to radio controllers for model airplanes and joysticks and trackballs for video games, teaching pendants allow an operator to control a robot intuitively so that it performs a desired set of movements. An appropriately equipped robot can then autonomously repeat the programmed movements, or calculated improvements thereon.

One useful class of robots is an arm with six axes of movement, i.e., degrees of freedom. The six axes can differ depending on the particular type of robot. In one such type, there are axes used to position a robot hand in XYZ space. The hand can bend and rotate, defining two more axes. A sixth axis of movement is a pinching of fingers used in grasping objects.

Most robots are taught with teach pendants comprising a box with an array of switches that, when pressed, cause the robot to move. This approach is difficult to learn because switch positions are not intuitively related to the corresponding robot motions.

Joysticks, upon which some other teaching pendants are based, basically comprise a body and a member mechanically coupled to the body so as to have at least two axes of movement with respect to the body. With the appropriate interfacing, manipulation of the joystick can control plural axes of movement for a robot at a time. More sophisticated joysticks, adding vertical translational and/or rotational movement of the member, can provide for three or four axes. Even these enhanced and more expensive joysticks fall short of controlling six-axis robots.

The number of axes controllable by a joystick can be multiplied by providing for reassigning the robot axes to be controlled by the joystick. Thus, for example, a teaching pendant can include: a first button which, when actuated, assigns a joystick axis to an X-axis of translational movement of a robot arm; a second button which, when actuated, assigns two joystick axes to respectively Y and Z axes of robot arm movement; a third button which, when actuated, assigns two joystick axes to bending and rotation of the robot hand; and a fourth button which, when actuated, controls pinch. Of course, the buttons could be programmed to select other assignments between joystick axes and robot axes.

However the assignments are made, the use of manual switches to select different assignments is inherently non-intuitive. Moreover, the intuitive nature of the joystick is used to its advantage for only one or two of the assignments. While a joystick might provide optimally intuitive control of movement in an XY plane, upon reassignment to control movement along a Z axis, the joystick can become counter-intuitive.

The result is that operators must be trained over a period of weeks to master a teaching pendant, and significant retraining can be required after nonuse for even a day or two. Thus, a more intuitive controller for robotics and other applications requiring movement along multiple axes is required.

SUMMARY OF THE INVENTION

A controller includes an orientation sensor so that its outputs can be reassigned according to the controller's orientation to a gravitational field or other external frame of reference. Sensing orientation with respect to the gravitational field can be effected by incorporating in the controller two or three mercury switches properly oriented with respect to the controller. Such switches can provide discrete orientation determinations corresponding to a desired controller reassignment. To maintain intuitive operation, the number of orientations providing different controller assignments can be limited to six.

The controller can be interfaced with a robot or other object to be moved in a predefined space. For example, in one orientation, a joystick controller can be assigned to control X and Y axis movements of a robot arm, while in a second orientation, it can be assigned to control Y and Z axis movements, and in a third orientation, it can be assigned to control hand movements. A computer-based interface provides the translations of joystick position and controller orientation determinations into the proper drive commands for effecting the assignments and motions.

By properly selecting assignments as a function of controller orientation such that the robot moves in the same direction that the stick is moved, a highly intuitive multi-axis controller is provided. This controller is economical in that only a minor modification need be made to existing controllers to add the switches. Reliability is insured since the orientations sensor operate free of the wear and tear manual button type switches must endure. Further features and advantages of the present invention are apparent in the description below with reference to the following drawings.

DESCRIPTION OF THE PREFERRED EMBODIMENTS

Figures 1, 2A, 2B, 2C:
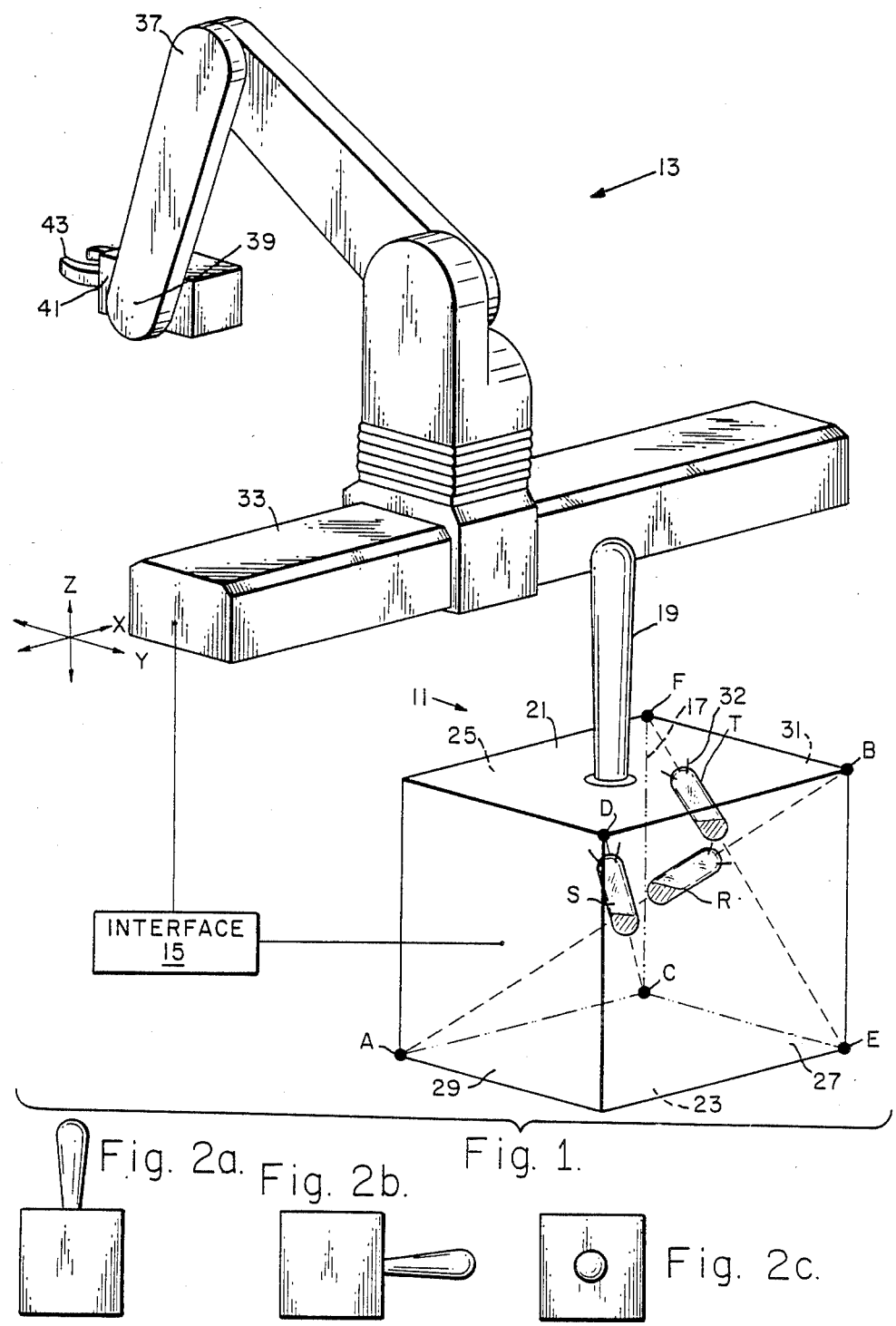
FIG. 1 is a schematic illustration of a robotics system with a teaching pendant in accordance with the present invention.
FIGS. 2A, 2B and 2C are perspective views of the teaching pendant of FIG. 1 in three different orientations.

A robotics system shown in FIG. 1 includes a teaching pendant 11, a robot 13, and a computer-based interface 15. Teaching pendant 11 has a body 17, a joystick 19, and three mercury vial switches R, S and T. The mercury vial switches are aligned so that together they can distinguish six useful orientations of teaching pendant 11. Body 17 is shown in the form of a cube to illustrate the preferred alignment of the mercury switches along various diagonals; in a commercial system, the body can be shaped for operator comfort.

As shown in FIG. 1, body 17 has six faces: a top face 21 from which the joy stick extends, a bottom face 23, a front face 25, toward the robot as shown; a rear face 27, normally toward the operator when oriented as shown, a right face 29 and a left face 31. Mercury vial switch R extends from the right lower front vertex A to the left upper rear vertex B of the cube, mercury vial switch S extends from the left lower front vertex C to the right upper rear vertex D, and mercury vial switch T extends from the left lower rear vertex E to the left upper front vertex F.

Each mercury vial switch includes a pair of contacts 32 at its upper end. A switch R, S, T, is closed when its contacts 32 are coupled by mercury, and open when, as in FIG. 1, the mercury is at the bottom end of each vial. Implied in FIG. 1 are the transducers and electronics required to convert joystick parameters into output signals, i.e., joystick position into two analog signals representing two positional vectors, joystick rotation into a third analog signal, and the status of the switches R, S and T into binary signals.

The operation and advantages of teaching pendant 11 are best understood in relation to robot 13, which is a six-axis robot arm. The axes are: (1) a track 33 providing translational motion along an X axis; (2) a pivotable shoulder 35 providing rotational motion in an YZ plane; (3) a pivotable elbow 37, also providing rotational motion in the YZ plane; (4) a pivotable wrist 39 for orienting the hand in the YZ plane; (5) a rotatable hand 41 for rotation about an axis determined primarily by the pivotable wrist; and (6) fingers 43 for grasping motions orthogonal to the rotation axis.

With teaching pendant 11 oriented as in FIG. 1, with joystick 19 up, front face 25 toward robot 13 and rear face 27 toward the operator, displacement of joystick 19 controls the motion of robot 13 in the XY plane. Movement in the X direction is effected by translation along track 33. Movement in the Y direction requires coordination of shoulder 35, elbow 37 and wrist 39. This coordination is provided by computer-based interface 15. More generally, interface 15 converts the mercury switch status signals to effect controller-robot assignments, and on the basis of the assignment selected, converts joystick position and orientation signals into the proper drive signals to effect the proper robot arm motion. Generally, the degree of joystick displacement or rotation is converted proportionally to translational or angular velocity.

Three intuitively useful orientations are illustrated in FIGS. 2A, 2B and 2C. In FIG. 2A, joystick 19 is pointing upward in which orientation it can intuitively control movements in the XY plane. In FIG. 2B, joystick 19 is pointing to the right, from the perspective of the operator. In this orientation, it can intuitively control movement in the YZ plane. The interface makes the proper assignment and converts joystick displacement into shoulder 35 and elbow 37 drive commands. In FIG. 2C, joystick 19 is pointing to the rear, i.e., toward the operator, in which orientation it can also be used intuitively to control motion in the XZ plane.

Interface 15 determines which sense should be applied to its drive signals on the basis of the binary signals received from the mercury vial switches. Thus, vertical displacement signals are interpreted in opposite ways depending on whether joystick 19 is oriented to the left or to the right to maintain intuitive control in the XZ plane. A similar difference in displacements translation occurs between the upward orientation of FIG. 2A and a downward joystick orientation to be used intuitively for XY movements by operators who lie on their backs while manipulating robots.

Both mercury vial switches R and S are off and switch T is on when top face 21, i.e., the joystick end, of pendant 11 is directed toward robot 13 and away from the operator. This condition signals interface 15 that vertical displacement of joystick 19 is assigned to wrist motion, and that horizontal displacement is assigned to rotational hand motion. In the later case, a joystick displacement to the right causes clockwise rotational motion, and a joystick motion to the left causes counterclockwise rotational motion. As an alternative to the above, the rotational motion can be assigned to rotation of the joystick. However, in the illustrated system, joystick rotation is consistently assigned to pincher movement in all orientations.

In this embodiment, the forward pointing orientation is the only one in which joystick motions are not assigned to the robot's X, Y and Z motion control. In any of the other five orientations, an operator can move the robot arm in a direction by displacing the joystick in that direction. Thus, XYZ translational motions are rendered completely intuitive by the present invention. In order to prevent assignment oscillations when pendant 11 is moved about an oblique orientation, pendant 11, or alternatively, interface 15, is provided with a low-pass filter and Schmitt trigger or some other digital or analog filtering means.

The present invention provides for innumerable variations. The use of two mercury vial switches permits four pendant orientations to be distinguished. The use of the three mercury vial switches, as in the illustrated embodiment, permits all six faces to be distinguished by the interface.

The present invention is compatible with a variety of controller types including basic two-axis joysticks, joysticks with rotation as used in the illustrated pendant 11, joysticks with vertical displacement, and trackballs. Force-sensing joysticks are provided for as a special case of displacement-sensing joysticks, since inevitably there is some joystick displacement when force is applied. In simpler applications, the controller could be a one-dimensional slider or spring loaded wheel, its function being assignable by controller reorientation.

The means for sensing orientation can be varied, as can the external frame of reference. For example, the frame of reference could be inertial space with orientation being determined by a laser gyro. The frame of reference could be a magnetic or electrical field, with magnets or currents being used to sense orientation. Furthermore, orientation can be sensed in finer increments than 90°; such as 45° increments or continuously. In addition, a great variety of joystick transducers are known and can be incorporated into a controller provided by the present invention.

The present invention provides for control of a great variety of objects, in addition to a six-axis robot arm. The present invention can be applied to cursor movement within a three-dimensional spreadsheet. In the context of home entertainment, controller orientation could be used to select a device, such as a television or audio component, and one joystick axis can be assigned program or station control, with the other axis assigned to volume. These and other variations and modifications are provided by the present invention, the scope of which is limited only by the following claims.

We claim:

1. A system for controlling the movement of an object having multiple axes of movement in a predefined space using a drive means for moving said object with respect to said predefined space in response to a drive signal, said drive means having an input means for receiving a drive signal, said system comprising:

a body;

a member mechanically coupled to said body so as to provide at least two axes of displacement relative to it;

transducer means for providing displacement signals representing the displacement of said member relative to said body;

an orientation sensor for providing orientation signals as a function of the orientation of said body with respect to an external frame of reference; and interface means, coupled to said orientation sensor and said transducer means, for providing a drive signal to said input means in response to said displacement signals and said orientation signals so that when said body is in a first orientation with respect to said external frame of reference, said object moves in said predefined space as a first function of said displacement signals, said first function being a mapping of member relative displacement into a first set of at least two of said multiple axes, and so that when said body is in a second orientation with respect to said external frame of reference, said object moves in said predefined space as a second function of said displacement signals, said second function being a mapping of member relative displacement into a second set of at least one of said multiple axes, said second set including at least one of said multiple axes not in said first set.

2. The system of claim 1 wherein said orientation sensor distinguishes between at most six orientations.

3. The system of claim 1 wherein said member is a joystick.

4. The system of claim 1 wherein said orientation sensor senses gravity.

5. A system comprising:

an object having multiple axes of movement in a predefined space;

drive means for moving said object with respect to said object space in response to a drive signal, said drive means having an input means for receiving a drive signal; and a body;

a member mechanically coupled to said body so as to provide at least two axes of displacement relative to it;

transducer means for providing displacement signals representing the displacement of said member relative to said body;

an orientation sensor for providing orientation signals as a function of the orientation of said body with respect to an external frame of reference; and interface means, coupled to said orientation sensor and said transducer means, for providing a drive signal to said input means in response to said displacement signals and said orientation signals so that when said body is in a first orientation with respect to said external frame of reference, said object moves in said predefined space as a first function of said displacement signals, said first function being a mapping of member relative displacement into a first set of at least one of said multiple axes, and so that when said body is in a second orientation with respect to said external frame of reference, said object moves in said predefined space as a second function of said displacement signals, said second function being a mapping of member relative displacement into a second set of at least one said multiple axes, said second set including at least one of said multiple axes not in said first set.

6. The system of claim 5 wherein said object is a robot in inertial space.

7. The system of claim 5 wherein said object is a cursor in a 3-D virtual space represented on a 2-D display.

8. The system of claim 5 wherein said set includes at least six axes of movement, said orientation sensor distinguishing plural discrete orientations, said interface means providing drive signals to said drive means so that the function according to which said object moves in response to said displacement determinations is itself a function of said plural discrete orientations.

9. The system of claim 5 wherein said orientation sensor senses gravity.

10. The system of claim 5 wherein said member is a joystick.

* * * * *